Dec. 3, 1940.　　　　G. L. MOSES　　　　2,223,737
SHIELD FOR ELECTRICAL APPARATUS
Filed Dec. 22, 1938　　　2 Sheets-Sheet 1

WITNESSES:

INVENTOR
Graham L. Moses.
BY
ATTORNEY

Dec. 3, 1940. G. L. MOSES 2,223,737
SHIELD FOR ELECTRICAL APPARATUS
Filed Dec. 22, 1938 2 Sheets-Sheet 2
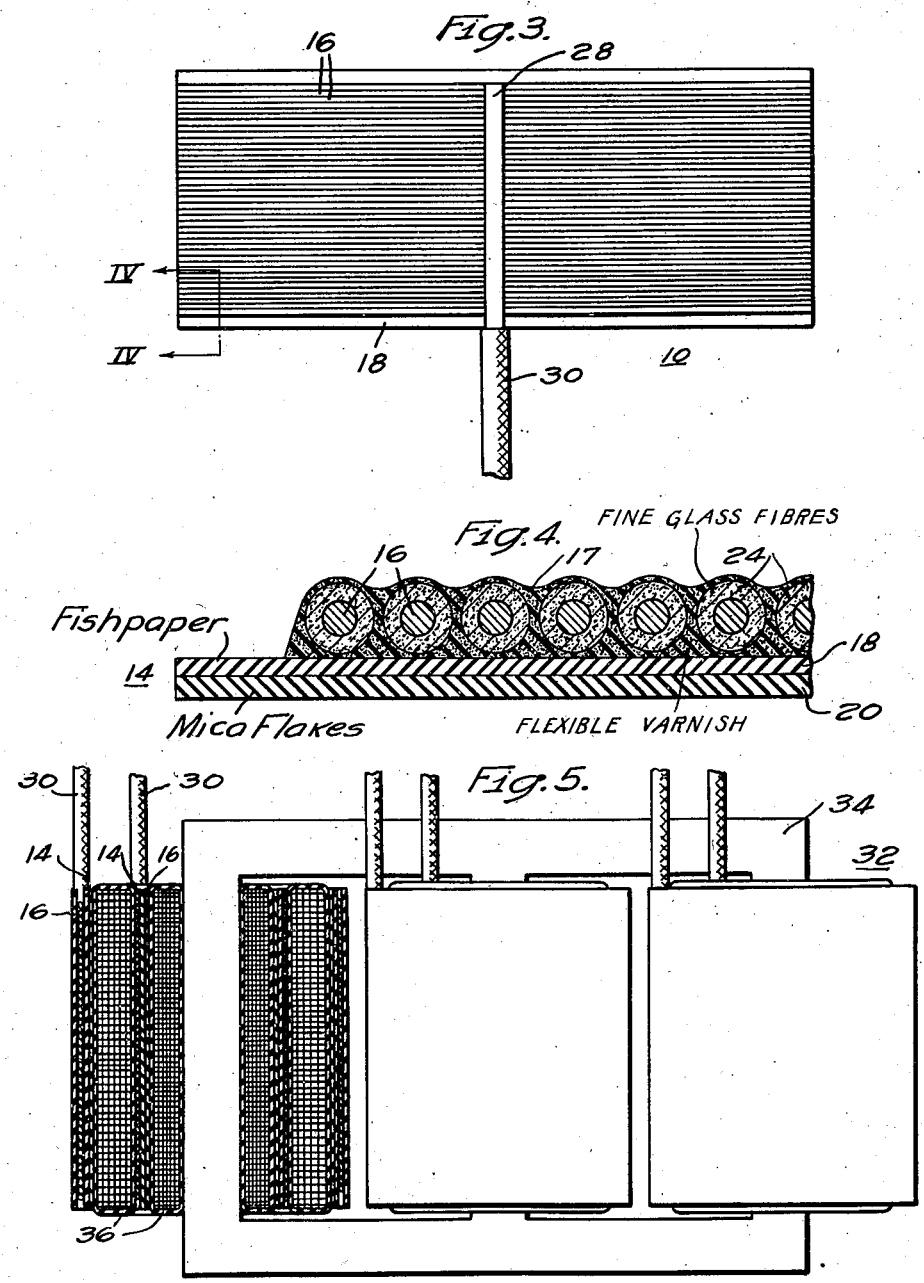

Patented Dec. 3, 1940

2,223,737

UNITED STATES PATENT OFFICE 2,223,737

SHIELD FOR ELECTRICAL APPARATUS

Graham L. Moses, Pittsburgh, Pa., assignor to Westinghouse Electric & Manufacturing Company, East Pittsburgh, Pa., a corporation of Pennsylvania Application December 22, 1938, Serial No. 247,205

1 Claim. (Cl. 175—356)

This invention relates to static shields for electrical apparatus.

In electrical apparatus, such as transformers or the like, shields are employed to prevent the passing of electrostatic disturbances from one winding to the other without interfering with the normal alternating flux. Different types of shields have been employed heretofore but these have not always been satisfactory. For example, where plates of conducting material have been employed in the form of a capacity shield, it is found that any induced voltage in the shield causes the circulation of eddy currents therein with resulting localized heating of the plate or shield, together with accompanying large power losses. In other forms constructed in an effort to overcome the disadvantages of the plate type of shield, it is found that the shields are not the electrostatic equivalent of the plate type or it is impossible to produce a flexible integral shield, or the insulation commonly associated with the shield will not withstand the high operating temperatures to which it may be subjected.

An object of this invention is to provide a static shield for electrical apparatus formed from a plurality of elements and which will be flexible, have a long life and be capable of withstanding high temperatures.

Another object of this invention is to produce a static shield for electrical apparatus formed from a plurality of conducts which are insulated from each other and which are securely bonded to a supporting base whereby the shield may be deformed as by bending, without damage thereto.

Other objects of this invention will become apparent from the following description, when taken in conjunction with the accompanying drawings, in which Figure 1 is a side elevational view of a shield produced in accordance with this invention;

Fig. 3 is a plan view of the static shield produced in accordance with this invention;

Fig. 4 is a view in section, greatly exaggerated, taken along the line IV—IV of Fig. 3; and Fig. 5 is an elevational view, partly in section, of apparatus utilizing the static shield of this invention.

Figure 1:
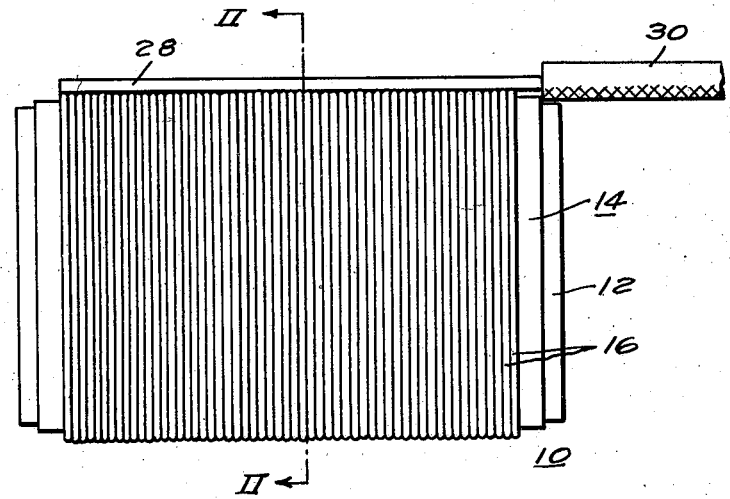
Figure 2:
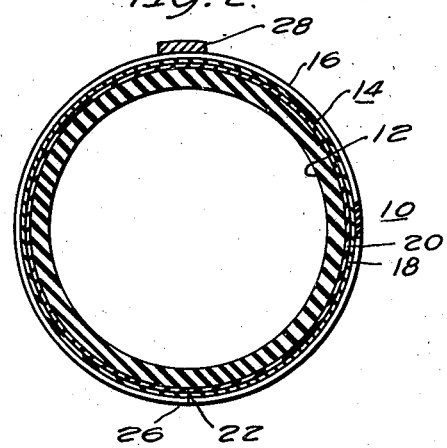
Fig. 2 is a view in section, taken along the line II—II of Fig. 1.

Referring to Figs. 1 and 2 of the drawings, the static shield 10 of this invention is illustrated as being formed on a mandrel 12 of any predetermined size. In making the shield 10, any suitable insulating material is employed in sheet form as a base 14 for supporting a plurality of conductors 16 thereon. In practice, a composite sheet of insulating material formed as illustrated in Fig. 4 from a sheet of fishpaper 18 and a sheet of mica flakes 20 bonded together by means of a flexible bond (not shown) is found to be quite satisfactory. Since it is possible that the sheet of mica flakes may delaminate, it is preferred to utilize the prepared insulating material with the sheet of fishpaper 18 adjacent the conductors 16. Thus, in forming the shield, the sheet of insulating material 14 is wound or wrapped about the mandrel 12 with the layer 20 of the mica flakes adjacent the mandrel.

In forming the shield, the sheet of insulating material 14 is preferably wrapped about the mandrel 12 to provide a cylinder of insulating material as the supporting base of the shield with only one joint, as indicated at 22 in Fig. 2, in the insulation. The cylindrical form is desired for the supporting base, since it eliminates any possible sharp corners during the formation of the shield and facilitates the application of the conductors 16 thereto.

After the supporting base is formed on the mandrel, the conductors 16 are disposed thereon. These conductors are formed from a single wire of conducting material, such as copper, which is provided with a suitable insulating covering 24, as shown in Fig. 4. In order to withstand the high temperatures to which the shield is sometimes subjected during operation, the insulation is formed from a suitable material, such as glass fibers, which are applied thereto in any suitable manner. The glass fibers are of such fineness, preferably having a diameter of not over .00025 inch, that they are so flexible they can readily be bent about a wire having a small radius without breaking.

The glass fibers are formed of an inorganic glass and may be of either the staple filament or continuous type of fibers. The continuous type is to be preferred because the length of the fibers facilitates the application of the insulation to the wire. These fibers may be applied to the conductor in the form of thread, roving, textile or any other suitable form and are acid and heat resistant, being stable at somewhat elevated temperatures.

In applying the insulated wire to the supporting base 14, it is wound thereon with adjacent turns quite close but insulated from each other by reason of the glass fiber covering 24. In order to retain the conductors 16 in position upon the insulating base, a plastic varnish 17 containing a suitable drying oil, such as linseed oil, China wood oil or cashew nut oil is applied to the insulated conductor, completely coating it and impregnating the fibrous insulating covering of the conductors, securely bonding them to the supporting base of insulating material. A preferred varnish is one having an asphaltic base with one of the drying oils referred to hereinbefore and which when air dried has an extremely long life, remaining sufficiently flexible to permit manual distortion of the type as will be explained hereinafter.

After the insulator wire is bonded to the base 14, each of the turns of the wire is cut, as at 26 in Fig. 2, along the line of the joint in the insulating material of the supporting base. The insulated conductor is thus cut along the joint of the insulated base in order to prevent any possible cracks or breaks in the insulating material of the supporting base during its formation. Thus a plurality of insulated conductors 16 are formed bonded to the supporting base, each conductor being in effect an independent shield.

In order to provide a lead for grounding each of these independent shields during operation, the insulation of each of the conductors 16 is cut and removed therefrom at a point substantially midway from the ends thereof, this being substantially 180° from the joint in the supporting base. At this point a ground lead 28 is soldered to the bare wire of each of the conductors, thus forming a common ground lead for the shield. Usually the lead is provided with insulation 30 which may also be of glass fibers in order to protect the connection from the shield to the ground. By soldering the ground 28 to each of the conductors at this point, which is at a minimum distance from the ends of the conductor, it is found that the minimum impedance to the flow of electrostatic charges to the ground is obtained.

Where desired, the ground lead 28 is first soldered to each of the turns of the wire wound on the supporting base of insulating material, as described, after which the flexible varnish is applied to the turns which are thereafter cut as at 26 to provide the plurality of conductors 16. The varnish thus applied forms an insulating coating over the metallic ground lead and flows between adjacent conductors at the points of soldering the lead to insure insulation of the conductors and the lead.

After the conductors 16 are securely bonded to the insulating base 14, and the ground lead 28 is soldered to each of the conductors, the assembled unit can be removed from the mandrel 12 and opened up into the flat plane shown in Fig. 3 for storage purposes and for shipping preparatory to applying it to the turns of apparatus which are to be shielded. An examination of the shield 10 in this form reveals that the varnish utilized for securely bonding the conductors 16 to the insulating base 14 remains sufficiently flexible after it has been air dried to permit bending of the shield 10 around the coils of the apparatus which are to be protected. The shield is integral and even sharp bending thereof does not effect a splitting of the members of the shield. Further, since the insulation of the conductors 16 is formed of glass fibers, it is found that the shield thus formed is capable of withstanding extremely high temperatures of the order of 175° C., without the insulation between the individual conductors failing. This limitation as to operating temperature is imposed by the varnish employed, the glass insulation itself being capable of withstanding temperatures of the order of 400° C. or 500° C.

In order to explain the mode of applying the shield of this invention, reference may be had to Fig. 5 which illustrates the core and coil assembly 32 of a transformer in which the core 34 is formed having a plurality of legs, each of which is provided with two coils 36. In constructing such apparatus, it is desirable to provide the coils with a suitable static shield for preventing the passing of electrostatic disturbances from one winding to the other. A shield 10, illustrated in Fig. 3, is thus bent about each of the coils 36, as illustrated in Fig. 5, with the edges of the shield overlapping to provide a completely shielded surface about the coil. Other apparatus may be similarly protected.

From the foregoing, it is apparent that the shield of this invention is quite flexible and because of the insulation employed in insulating each of the conductors of the shield, has a long life at elevated temperatures. Further, the shield of this invention formed from the plurality of insulated conductors is the electrostatic equivalent of the flat plate type of shield without having its disadvantages. Instead of large eddy currents circulating in the shield, as is found in the plate type of shield, the eddy currents encountered where the shield of this invention is employed are maintained extremely small, their circulation being restricted to single conductors of the shields.

Although this invention has been described with reference to particular embodiments thereof, it is, of course, not to be limited thereto, except insofar as is necessitated by the prior art and the scope of the appended claim.

I claim as my invention:

A static shield for electrical apparatus comprising, in combination, a flexible supporting base of insulating material formed from a layer of fishpaper and a layer of mica flakes bonded together with a flexible bond, the layers being of equal size to cooperate in giving a continuous sheet for the base when superimposed one on the other, a plurality of conductors disposed in parallel relation to each other on the insulating base and spaced from the layer of mica flakes by the layer of fishpaper, a common lead disposed to be electrically connected to each of the parallel conductors, said connection being made at a point substantially midway of the distance between the ends of each of said conductors, electrical insulation comprising a covering of glass fibers applied directly about each conductor, said glass fibers being long and extremely fine having an average diameter of not over .00025 inch, and an insulating material comprising a flexible varnish applied to the covered conductors, the insulating material impregnating the covering of the conductors and securely bonding them to the supporting base, the insulating base, insulated conductors and varnish applied thereto having the characteristic of being sufficiently flexible to permit deformation of the assembled shield without damage thereto.

GRAHAM L. MOSES.